(12) United States Patent
Al Jarri

(10) Patent No.: US 11,799,917 B2
(45) Date of Patent: Oct. 24, 2023

(54) SYSTEM, METHOD, AND COMPUTING MEDIUM TO REMEDIATE CYBERSECURITY RISKS BASED ON A RISK RATING

(71) Applicant: Saudi Arabian Oil Company, Dhahran (SA)

(72) Inventor: Johara Abdulrahman Al Jarri, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 411 days.

(21) Appl. No.: 17/157,128

(22) Filed: Jan. 25, 2021

(65) Prior Publication Data

US 2022/0239702 A1    Jul. 28, 2022

(51) Int. Cl.
*H04L 9/40* (2022.01)
*G06F 21/57* (2013.01)
*H04L 29/06* (2006.01)

(52) U.S. Cl.
CPC .......... *H04L 63/205* (2013.01); *G06F 21/577* (2013.01); *H04L 63/104* (2013.01); *H04L 63/105* (2013.01); *H04L 63/1425* (2013.01); *H04L 63/1433* (2013.01)

(58) Field of Classification Search
CPC ............. H04L 63/1425; H04L 63/1433; H04L 63/1441; H04L 63/20; G06F 21/577; G06F 21/55; G06F 21/50
See application file for complete search history.

(56) References Cited

U.S. PATENT DOCUMENTS

| | | | |
|---|---|---|---|
| 8,495,746 B2 | 7/2013 | Fissel et al. | |
| 9,338,181 B1 * | 5/2016 | Burns | H04L 63/1433 |
| 10,120,778 B1 | 11/2018 | Makohon et al. | |
| 10,740,469 B2 | 11/2020 | Zheng et al. | |
| 2002/0014780 A1 | 10/2002 | Searfoss | |
| 2002/0147803 A1 | 10/2002 | Dodd et al. | |
| 2015/0033218 A1 | 11/2015 | Chancey et al. | |
| 2015/0332184 A1 | 11/2015 | Osborn | |

(Continued)

OTHER PUBLICATIONS

Ramadlan, M. F. "Introduction and implementation OWASP Risk Rating Management." Open Web Application Security Project (2019). 28 pages.

(Continued)

*Primary Examiner* — Edward Zee
(74) *Attorney, Agent, or Firm* — Leason Ellis LLP

(57) ABSTRACT

A system, a method, and a computer program remediate a risk of a computing resource located in a computer network that has a plurality of other computing resource assets each having an associated risk. Data associated with a first computing resource is received, and a first risk framework is selected from among a plurality of risk frameworks. A risk score is calculated based on the received data and the selected first risk framework, and a first risk rating is determined based on the risk score. The first risk rating is compared against a zone risk rating to determine whether the first risk rating is greater than the zone risk rating, and the first risk rating is replaced by the zone risk rating when the zone risk rating is greater than the first risk rating. The cybersecurity risk of the first computing resource is remediated according to the first risk rating.

20 Claims, 5 Drawing Sheets

(56) References Cited

U.S. PATENT DOCUMENTS

2016/0024879 A1    8/2016   Bushman et al.
2016/0248797 A1    8/2016   Yampolskiy et al.

OTHER PUBLICATIONS

No Author, "Cyber Risk Appetite: Defining and Understanding Risk in the Modern Enterprise" RSA (2016). 4 pages.
No Author; CVSS v3.1 Specification Document. FIRST, www.first.org/cvss/specification-document; 20 pages; retrieved Jan. 25, 2021.

* cited by examiner

SYSTEM, METHOD, AND COMPUTING MEDIUM TO REMEDIATE CYBERSECURITY RISKS BASED ON A RISK RATING

FIELD OF THE DISCLOSURE

The present disclosure relates to a cybersecurity solution that includes a system, method and computer program for remediating cybersecurity risks in a computer network based on a risk rating.

BACKGROUND OF THE DISCLOSURE

The Internet is a worldwide network of interconnected computer networks that use the Transmission Control Protocol/Internet Protocol (TCP/IP) to link communicating devices worldwide. The Internet includes private, public, academic, business, and government networks, all of which are interlinked by arrays of electronic, wireless, wired, or optical networking technologies. The Internet carries a broad range of information resources and services, including the World Wide Web (WWW), electronic mail, telephony, and file sharing. As the Internet evolves and network systems become increasingly under attack and have associated risks, cybersecurity solutions to such risks are taking on ever-greater importance. However, existing cybersecurity solutions have significant shortcomings, which are addressed by the technology solution provided in this disclosure.

SUMMARY OF THE DISCLOSURE

The disclosure provides a cybersecurity solution, including a system, a method, and a computer program to remediate a cybersecurity risk of a computing resource located in a computer network according to a risk rating.

In an embodiment, a method is configured to remediate a cybersecurity risk of a computing resource located in a computer network that has a plurality of other computing resources, each having an associated risk. The method comprises receiving data associated with a first computing resource in a network zone of the computer network, selecting a first risk framework from among a plurality of risk frameworks, and calculating a risk score of the first computing resource based on the received data and the selected first risk framework. The method further comprises determining a first risk rating for the first computing resource based on the risk score, comparing the first risk rating for the first computing resource against a zone risk rating to determine whether the first risk rating is greater than the zone risk rating, replacing the first risk rating by the zone risk rating for the first computing resource when the zone risk rating is greater than the first risk rating, and remediating the cybersecurity risk of the first computing resource according to the first risk rating.

In a more particular embodiment, the remediating of the cybersecurity risk includes assigning another computing resource to the first computing resource according to the calculated risk score. In additional particular embodiments, the plurality of risk frameworks are international risk frameworks. The first risk framework is selected from the group consisting of: the Open Web Application Security Project (OWASP) framework, the Common Vulnerability Scoring System (CVSS) framework, the TRIKE framework, and the OCTAVE framework. The selecting of the first risk framework is based on the received data. A memory is configured to store the calculated risk score so as to define a score board of the calculated risk scores.

In a further particular embodiment, the method further comprises identifying a plurality of computing resources, grouping the plurality of computing resources, evaluating the grouped computing resources based on a stored risk rating, and computing a total value of a cybersecurity risk associated with the grouped computing resources.

In another particular embodiment, the method further comprises calculating an average risk score from a plurality of risk scores, each corresponding to the associated risks of the plurality of other computing resources and remediating the cybersecurity risk of the first computing resource according to the calculated average risk score. The remediating of the cybersecurity risk includes assigning another computing resource to the first computing resource according to the calculated average risk score. A memory is configured to store the calculated average risk score so as to define a score board of the calculated risk scores.

In another embodiment, a non-transitory computer readable storage medium stores computer program instructions that, when executed by a security appliance, remediate a cybersecurity risk of a computing resource located in a computer network that has a plurality of other computing resources, each having an associated risk. The computer program instructions comprise receiving data associated with a first computing resource in a network zone of the computer network, selecting a first risk framework from among a plurality of risk frameworks, and calculating a risk score of the first computing resource based on the received data and the selected first risk framework. The computer program instructions further comprise determining a first risk rating for the first computing resource based on the risk score, comparing the first risk rating for the first computing resource against a zone risk rating to determine whether the first risk rating is greater than the zone risk rating, replacing the first risk rating by the zone risk rating for the first computing resource when the zone risk rating is greater than the first risk rating, and remediating the cybersecurity risk of the first computing resource according to the first risk rating. The remediating of the cybersecurity risk includes assigning another computing resource to the first computing resource according to the calculated risk score.

In a more particular embodiment, the first risk framework is selected from the group consisting of: the Open Web Application Security Project (OWASP) framework, the Common Vulnerability Scoring System (CVSS) framework, the TRIKE framework, and the OCTAVE framework. The computer program instructions further comprise calculating an average risk score from a plurality of risk scores, each corresponding to the associated risks of the plurality of other computing resources and remediating the cybersecurity risk of the first computing resource according to the calculated average risk score. The remediating of the cybersecurity risk includes assigning another computing resource to the first computing resource according to the calculated average risk score.

In a further embodiment, a system is configured to remediate a cybersecurity risk of a computing resource located in a computer network that has a plurality of other computing resources, each having an associated risk, with the system comprising a security analyst communicating device configured to receive data associated with the first computing resource in a network zone of the computer network, and to select a first risk framework from among a plurality of risk frameworks. The system further comprises a security appliance configured to calculate a risk score of the first computing resource based on the received data and the selected first risk framework, to determine a first risk rating for the first computing resource based on the risk score, to compare the first risk rating for the first computing resource against a zone risk rating to determine whether the first risk rating is greater than the zone risk rating, to replace the first risk rating by the zone risk rating for the first computing resource when the zone risk rating is greater than the first risk rating, and to remediate the cybersecurity risk of the first computing resource according to the calculated risk score.

In a more particular embodiment, the security appliance remediates the cybersecurity risk by assigning another computing resource to the first computing resource according to the calculated risk score. A memory is configured to store the calculated risk score. The security appliance calculates an average risk score from a plurality of risk scores, each corresponding to the associated risks of the plurality of other computing resources and remediates the cybersecurity risk of the first computing resource according to the calculated average risk score. The security appliance remediates the cybersecurity risk by assigning another computing resource to the first computing resource according to the calculated average risk score.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

Figure 1:
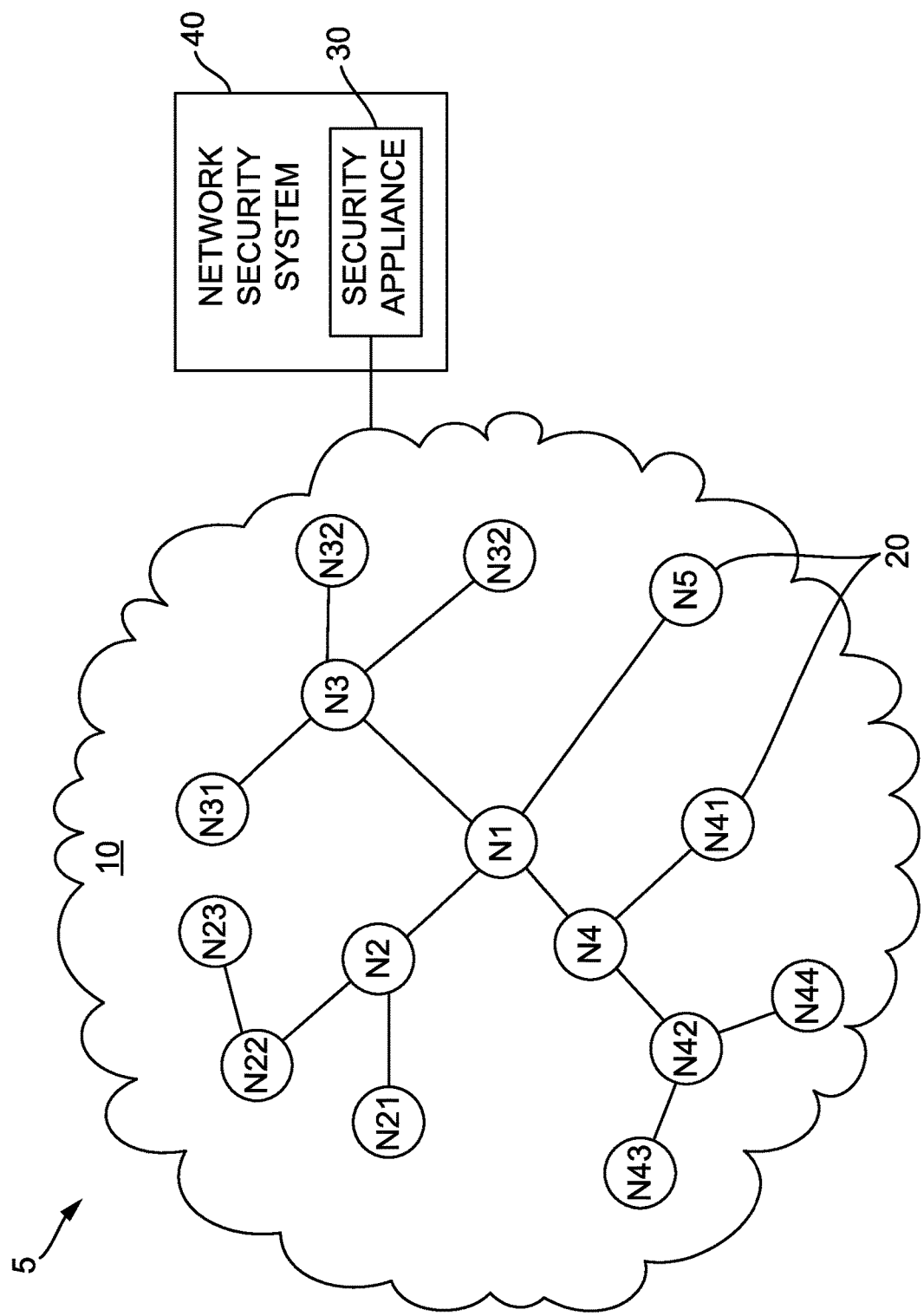
FIG. 1 shows a nonlimiting example of an environment provided with a cybersecurity solution according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale and features of one embodiment can be employed with other embodiments as those skilled in the art would recognize, even if not explicitly stated. Descriptions of well-known components and processing techniques can be omitted so as to not unnecessarily obscure the embodiments of the disclosure. The examples used are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Computer networks are continuously exposed to cyber-attack threats, many of which can be catastrophic to a computer network, network users or the entity that owns, controls, manages or has valuable computer (or computing) resources on the network, if successfully exploited. In computer networks with large footprints of computer resources, identification or assessment of security risks and vulnerabilities can be a daunting task. This is because large computer networks typically have large numbers of diverse computer resource assets, including servers, workstations, network devices, security appliances, IoT ("Internet of Things") devices, cameras, printers, software, middleware and temporarily connected communicating devices. The problem can become exasperated further as the number of discovered vulnerabilities increases daily, presenting information technology (IT) security teams with major or impossible challenges in addressing all discovered vulnerabilities and staying on top of their vulnerability management programs. The problem can be compounded by many times if the computer network is distributed with computer resource assets located in different geographic locations or regions, such as, for example, with distributed systems.

Applications and systems, once connected to a corporate network, can undergo a cyber-security risk assessment. The purpose of the risk assessment is to ensure that adequate security controls are placed over the application or the system. Assigning a risk rating for the assessed system allow decision makers to understand implication of connecting new system or application. Risk rating can be calculated by using various international frameworks for example: OWSAP, CVSS, TRIKE, and OCTAVE. All these frameworks calculate the risk based on general risk formula which is the likelihood multiplied by the impact. However, the difference between these frameworks is the factors that defines the likelihood as well as the factors that defines the impact on each framework. Choosing a risk rating is based on the type of the system or a government regulation. The process of the calculating the risk based on international framework is manual and requires a knowledge of the value for each given factor in the international framework. For example, OWSAP utilizes a risk rating from 0 to 9, while the CVSS scale is from 0 to 10. Therefore, there exists an urgent need for a cybersecurity solution that can assess network security posture or IT infrastructure and accurately and effectively identify those risks that are most critical or important to the particular computer network being assessed, so that the most critical or important risks can be timely remediated before they can be exploited to cause damage to the computer network or computer resource assets that are connected to the network.

A cybersecurity flaw is often referred to in the cybersecurity industry as a "vulnerability" or "security vulnerability," and it is defined in the ISO/IEC 27002 information security standard as "a weakness of an asset or group of assets that can be exploited by one or more threats." The ISO/IEC 27002 standard is published by the International Organization for Standardization (ISO) and the International Electrotechnical Commission (IEC). A system that is commonly employed to identify and assess principal characteristics of vulnerabilities in computing resource assets is the Common Vulnerability Scoring System (CVSS), which is the result of research carried out by the National Infrastructure Advisory Council (NIAC).

The CVSS is a free and open international industry standard for assessing the severity of computer system security vulnerabilities. CVSS produces and assigns numerical scores to vulnerabilities in computing resource assets. Scores are typically between 0 and 10, with 10 being representative of the most severe vulnerabilities. Its quantitative model ensures repeatable accurate measurement while enabling visibility into the underlying vulnerability characteristics that were used to generate the scores. CVSS scores can be used to calculate the risks associated with the vulnerabilities, as well as to prioritize remediation efforts. Other international frameworks are the Open Web Application Security Project (OWSAP), TRIKE, and OCTAVE.

This disclosure provides a cybersecurity solution that addresses the above urgent and unfulfilled need. The cybersecurity solution can adapt to each computer network and account for any IT infrastructure differences, providing remediation that can be tailored to each unique environment in which the solution is implemented. The cybersecurity solution can include a system, method or computer program for remediating the risks of computer resources in a network zone of a computer network.

FIG. 1 shows an example of an environment 5 provided with a cybersecurity solution according to the principles of the disclosure. The environment includes a computer network 10 such as, for example a private network, a private enterprise network, a business network, a corporate network, an academia network, a military network, a government network or any other type of network. The computer network 10 can include thousands, hundreds of thousands, millions or more nodes N, such as the nodes 20. Any one or more of the nodes N in the network 10 can include a computer resource that can be connected to an external network (not shown), such as, for example, the Internet, or a communicating device (not shown) that is located internally or externally to the computer network 10. The cybersecurity solution can include a security appliance 30 in a network security system 40.

The security appliance 30 can be arranged as a separate device or module that is internal or external to the computer network 10, or in a network security system 40 that includes a plurality of computing devices or modules. The network security system 40 can include a computing resource such as, for example, a server or a network of servers. The network security system 40 can be located anywhere internal or external to the computer network 10.

As seen in FIG. 1, the computer network 10 can include a plurality of nodes N, such as the nodes 20, including, for example, N1, N2, N21, N22, N23, N3, N31, N32, N33, N4, N41, N42, N43, N44, and N5. The security appliance 30 can communicate with any one or more of the nodes N in the computer network 10. The security appliance 30 can be implemented autonomously, without any human intervention.

The nodes N can include a variety of types of computer resource, including, but not limited to, for example, computer applications, applets, apps, servers, workstations, network devices, IoT devices, Internet Protocol (IP) cameras, third party computing resources, database engines, or programming source code.

The security appliance 30 can be arranged to accurately determine security vulnerabilities and risks in different types of computer resources. The security appliance 30 can be arranged to remediate determined vulnerabilities or send remediation instructions and data to a communicating device, such as, for example, a security analyst communicating (SAC) device 47 (shown in FIG. 2), which can be arranged to remediate the risks based on the remediation instructions or data, including interacting with a security analyst.

The security appliance 30 can be arranged to interact with all workstations, tablets, laptops, servers, databases, source code, software, middleware, web applications, IoT devices, smartphones, printers, facsimile machines, VoIP telephones, and any other type of computer resource included in the computer network 10, so as to provide comprehensive or complete coverage for the entire network 10.

The security appliance 30 can be arranged to analyze, assess or process the risk data for remediation based on the needs of the particular environment, including the computer network 10. The security appliance 30 can be arranged to remediate the risks that are determined to exist in the computer network 10, or to transmit risk remediation instructions or data to a computing resource asset, such as, for example, the SAC device 47 (shown in FIG. 2), which can be operated or overseen by a security analyst.

Figure 2:
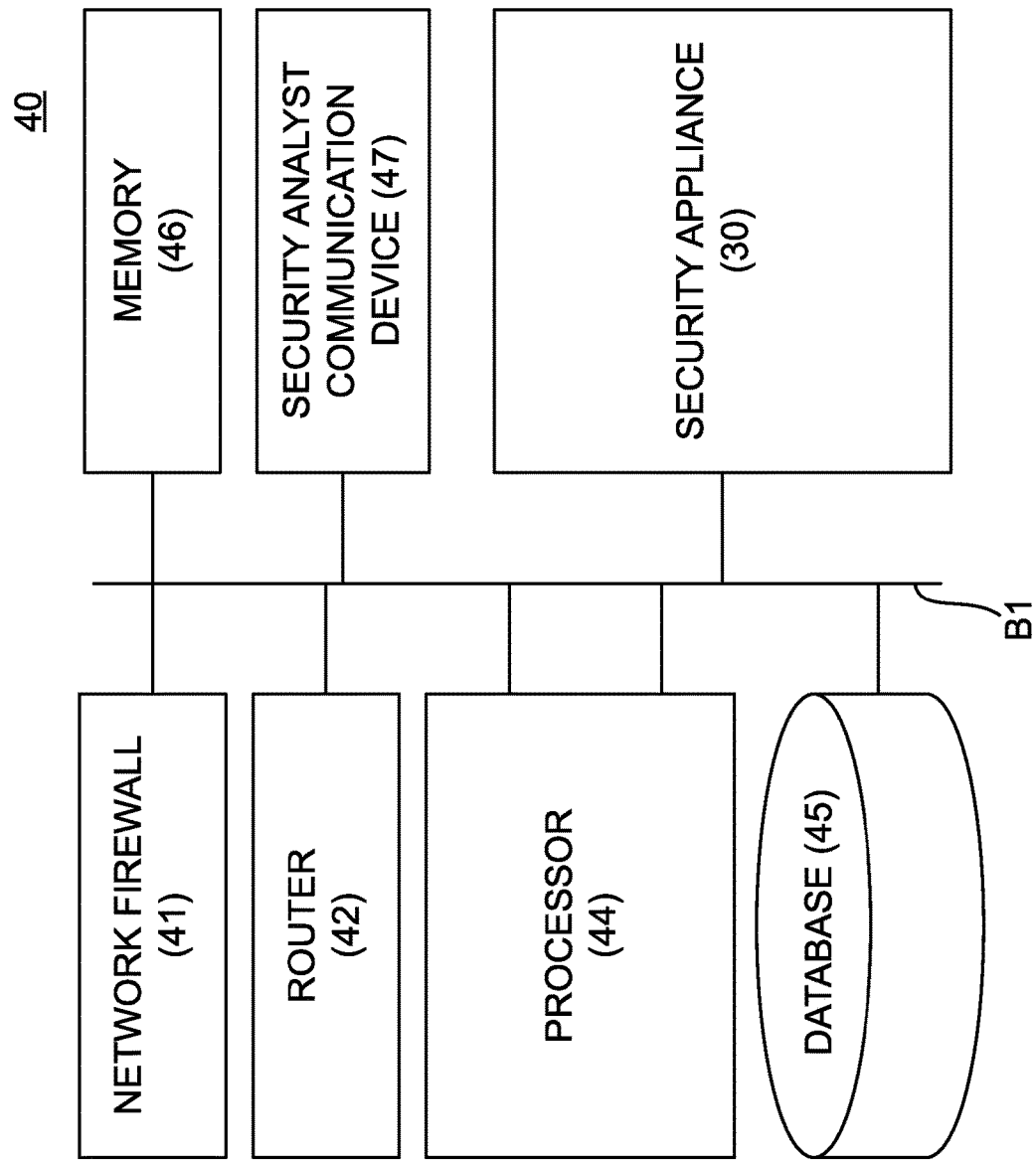
FIG. 2 shows a nonlimiting embodiment of a network security system that can be included in the cybersecurity solution according to the principles of the disclosure.

FIG. 2 shows a nonlimiting embodiment of the network security system 40, arranged according to the principles of the disclosure. The network security system 40 includes the security appliance 30. The network security system 40 can include additional computer resources that provide security analysis, malware protection, application visibility and control, reporting, secure mobility, and protection against threats that can arise relating to the computer resources in the computer network 10 (shown in FIG. 1). The network security system 40 can include a network firewall 41, a router 42, a processor 44, a database 45, and a memory 46. The network security system 40 can include a security analyst communicating (SAC) device 47. The network security system 40 can include a bus B1. Each of the components 30 and 41 to 47 can be connected to the bus B1 by a communication link.

The components 30 and 41 through 47 can be located at various nodes N in the computer network 10. One or more of the components 41 to 47 can be collocated with or incorporated into the security appliance 30.

The network security system 40 can be arranged to perform all security tasks for the computer network 10, including predicting vulnerabilities or attacks, detecting vulnerabilities, threats or attacks, identifying or predicting false positives, preventing threats or attacks, monitoring computer resources, remediating risks in computer resources, or responding to threats or attacks.

The network firewall 41 can be arranged to monitor all data traffic incoming into or outgoing from the computer network 10 and log source and destination IP addresses, port numbers, and protocols. The network firewall 41 can monitor connections and data packets for all protocols used by the computer network 10, including transmission control protocol (TCP), user datagram protocol (UDP), Internet control message protocol (ICMP), simple mail transfer protocol (SMTP), or any other protocol for data packets transmitted to, from, or within the computer network 10. The network firewall 41 can log all connections or data packets that are blocked by the firewall, which can be stored as log data locally in the network firewall 41 or in the database 45. The log data can include event data such as, for example, disabled port openings, dropped data packets, dynamic port openings, firewall policies and rules, repeated unsuccessful access attempts by a communicating device having a particular IP address or group of IP addresses, outgoing connections from servers in the computer network 10, or any other event or data that might be useful in identifying vulnerable computing resources in the network.

The network firewall 41 can be arranged to transmit, or it can be arranged to allow computer resources such as, for example, the security appliance 30, to access the firewall log data. The log data can be provided as one or more computer files (such as, for example, W3C extend log format (.log) files) or a data feed (such as, for example, a rich site summary (RSS) data feed), which can be transmitted at time intervals that are of sufficient frequency or duration to capture and transmit all firewall log data for the computer network 10 to the security appliance 30. The log data can include a header section comprising static, descriptive information about the log file or data, as well as available data fields, and a body section that includes compiled data relating to the data traffic that tried to cross the firewall. The log data can be transmitted to or accessed by the security appliance 30 as a dynamic list, continuously adding and transmitting (or accessing) the most recent firewall log events as they occur in real-time.

The router 42 can include one or more routing tables, which can include routing table data such as, for example, source IP address, destination IP address, route distance, network topology, network-next hop (or gateway) mapping, and interface IP address. The router 42 can be arranged to transmit, or it can be arranged to be accessed by the security appliance 30 to provide routing table data. The routing table data can be provided as one or more computer files or data feeds, which can be transmitted or provided at time intervals that are of sufficient frequency or duration to capture and provide all routing table data for the computer network 10.

The processor 44 can include a microprocessor, a controller, a printed circuit board (PCB), a motherboard, or any known type of processing device. The database 45 can include an SQL database or any known type of data structure configured to store and retrieve data in an organized format. The memory 46 can include random access memory (RAM), read only memory (ROM), or any known type of data structure configured to store and retrieve data. The database 45 can be included in the memory 46 or can be a separate and independent data structure from the memory 46.

The SAC device 47 can include a communicating device that is located at a node N on the computer network 10 (shown in FIG. 1). The SAC device 47 can be arranged to interact with or be operated by a security analyst. The SAC device 47 can be located internal or external to the computer network 10. The SAC device 47 can be arranged to perform risk analysis and remediation of computer resources at one or more nodes N in the computer network 10.

The SAC device 47 can be arranged to perform risk testing of the computer resources on the computer network 10 and to determine security risks, which can be logged in an SAC risk results report that can include, for each scanned computer resource or node, an IP address, a description of the computer resource, the type of computer resource, the time of risk testing and analysis, a description of risk testing performed, the type of security risk discovered, a description of the discovered risk, a description of the remediation (if any) performed or that should be performed, and the time the remediation (if any) was performed or should be performed. The SAC risk results data can be stored in the database 45.

Each of the database 45 or SAC device 47 can be arranged to transmit to or be accessed by the security appliance 30 to provide risk results data or SAC risk results data to the security appliance 30. The data can be provided periodically or continuously.

Figure 3:
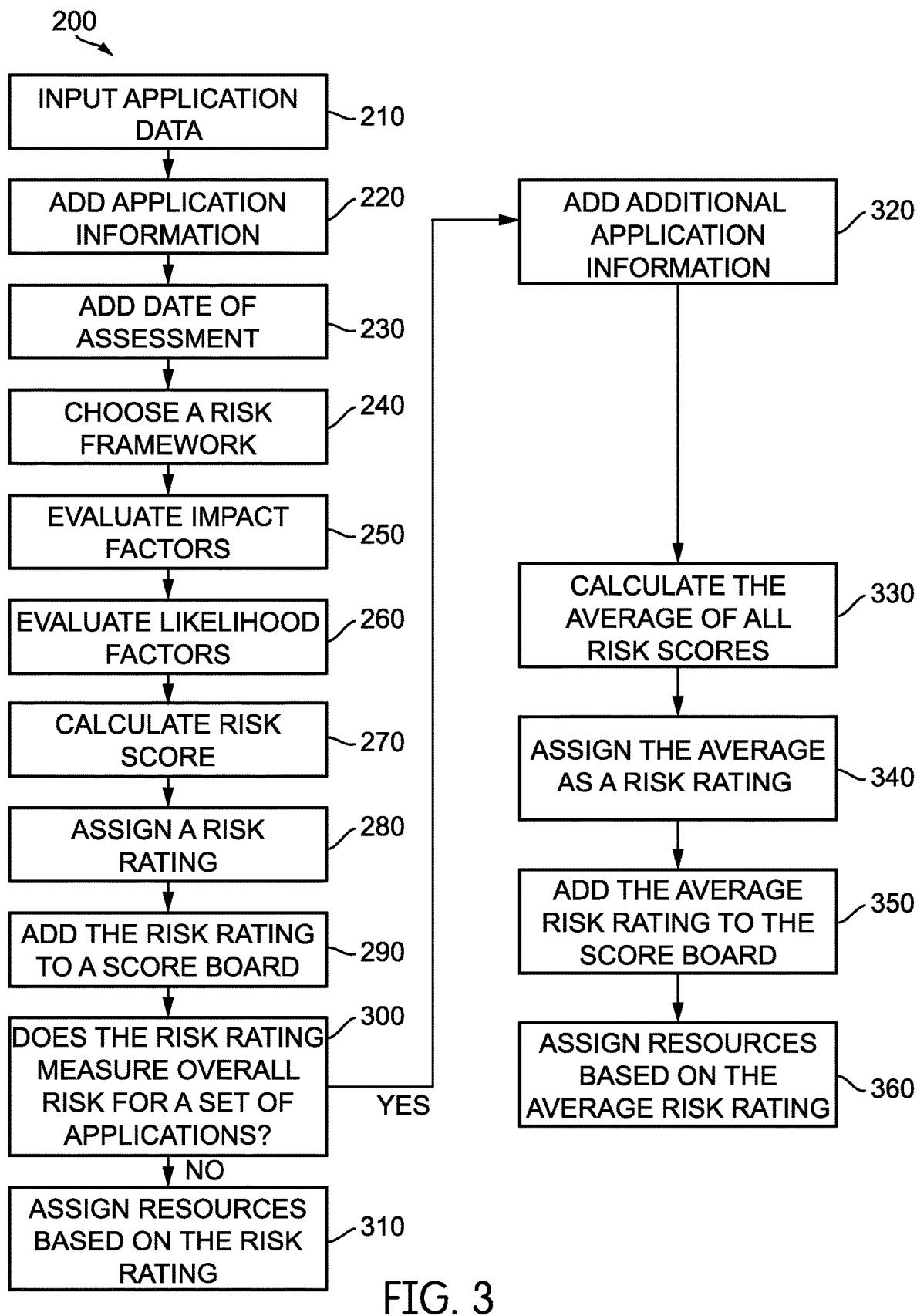
FIG. 3 is a flowchart of a method of operation according to the principles of the disclosure.

FIG. 3 shows a flowchart of operation of a method 200 that can be implemented by any of the components 30 and 41-47 (shown in FIG. 2). The method 200 includes inputting application data in step 210 for an application as a computer resource, adding application information in step 220, and adding a date of assessment of the risk of the application in step 230. The method 200 then selects or chooses a risk framework in step 240. The selection of the risk framework is performed from among known international risk frameworks, such as OWASP, CVSS, TRIKE, and OCTAVE.

All of these international risk frameworks calculate the risk based on a predetermined risk formula. An example risk formula is: risk equals likelihood of the risk event multiplied by the impact of the risk event. However, the differences between the frameworks are the factors which define the likelihood as well as the factors which define the impact on each framework.

For example, under CVSS, the likelihood can be defined by factors such as attack vector, attack complexity, privileges required, user interaction, and scope. Also, under CVSS, the impact can be defined by confidentiality, integrity, and availability.

In another example, under OWASP, the likelihood can be defined by skill level, motive, opportunity, size, ease of discovery, ease of exploit, awareness, and intrusion detection. Also, under OWASP, the impact can be defined by loss of confidentiality, loss of integrity, loss of availability, loss of accountability, financial damage, reputation damage, non-compliance, and privacy violation.

Referring to OWASP in greater detail, Table 1 below illustrates details of the various likelihood factors.

TABLE 1

| Skill Level: | Security penetration skills | Network and programming skills | Advanced computer user | Some technical skills | No technical skills | |
|---|---|---|---|---|---|---|
| Motive: | Low or no reward | Possible reward | High reward | | | |
| Opportunity: | Full access or expensive resources required | Special access or resources required | Some access or resources required | No access or resources required | | |
| Size: | Developers | System administrators | Intranet users | Partners | Authenticated users | Anonymous Internet users |

TABLE 1-continued

| Discovery: | Practically impossible | Difficult | Easy | Automated tools available |
|---|---|---|---|---|
| Exploit: | Theoretical | Difficult | Easy | Automated tools available |
| Awareness: | Unknown | Hidden | Obvious | Public knowledge |
| Intrusion Detection: | Active detection in application | Logged and reviewed | Logged without review | Not logged |

Referring to OWASP in greater detail, Table 2 below illustrates details of the various impact factors.

TABLE 2

| Loss of confidentiality: | Minimal non-sensitive data disclosed | Minimal critical data disclosed | Extensive non-sensitive data disclosed | Extensive critical data disclosed | All data disclosed |
|---|---|---|---|---|---|
| Loss of availability: | Minimal secondary services interrupted | Minimal primary services interrupted | Extensive secondary services interrupted | Extensive primary services interrupted | All services completely lost |
| Loss of integrity: | Fully traceable | Possibly traceable | Completely anonymous | | |
| Financial damage: | Less than the cost to fix the vulnerability | Minor effect on annual profit | Significant effect on annual profit | Bankruptcy | |
| Reputation damage: | Minimal damage | Loss of major accounts | Loss of goodwill | Brand damage | |
| Non-compliance: | Minor | Clear violation | High profile violation | None | |
| Privacy violation: | One individual | Hundreds of people | Thousands of people | Millions of people | |

The selection in step 240 can be performed by an automated framework selector. The automated framework selector can be predetermined software stored in the memory 46 and executed by the processor 44. Alternatively, the selection of the international risk framework can be performed by an analyst inputting the selection through the SAC device 47. In this embodiment, the SAC device 47 can be an input device configured to receive manual inputs for selections from the analyst.

Referring back to FIG. 3, the method 200 then evaluates impact factors in step 250, and evaluates likelihood factors in step 260, for example, using the factors in Tables 1 and 2. The method 200 calculates a risk score in step 270, and assigns a risk rating in step 280. The method 200 then adds the risk rating to a score board in the database 45 or the memory 46 in step 290. The score board stores risk ratings for all previously evaluated computer resources, such as applications and systems.

The method 200 then checks if the risk rating measures the overall risk for a set of applications in step 300. If not, the method 200 assigns computer resources to the application based on the risk rating in step 310.

Otherwise, if the risk rating measures overall risk for a set of applications in step 300, the method 200 adds additional application information in step 320, calculates the average or mean of all risk scores in step 330, and assigns the average as the risk rating in step 340. The method 200 then adds the average risk rating to the score board in step 350 and assigns computer resources to at least one of the applications in the set of applications based on the average risk rating in step 360.

Figure 4:
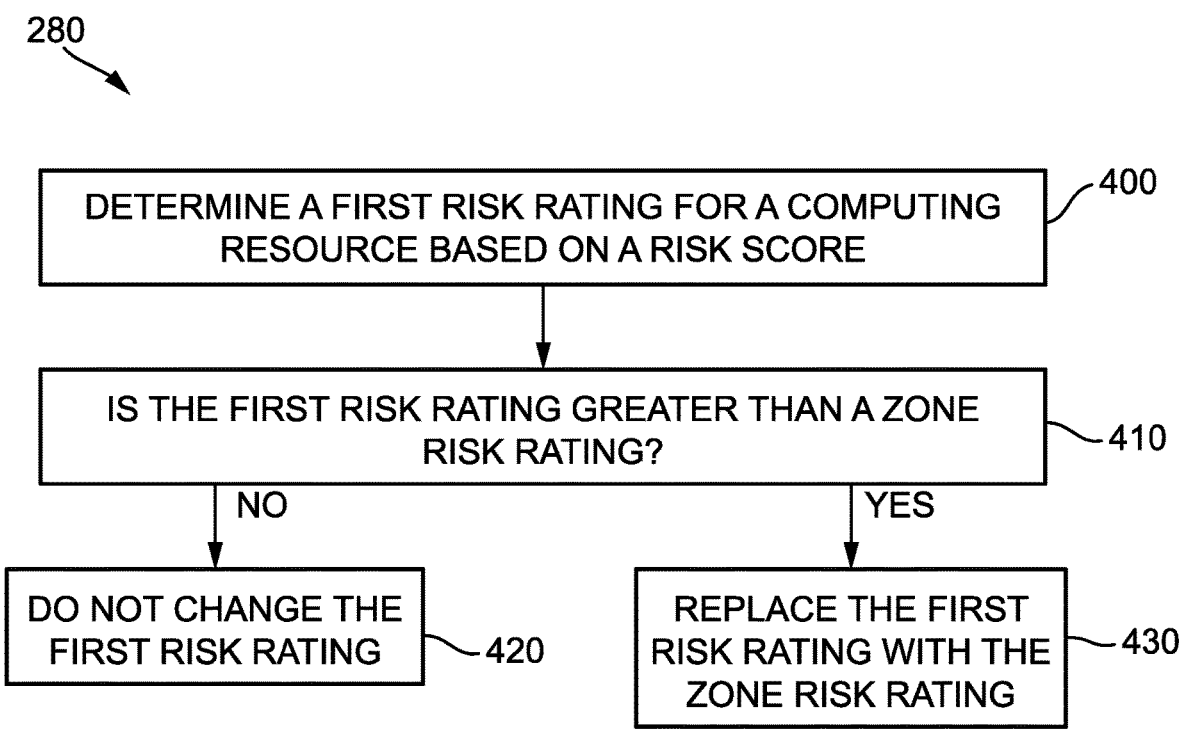
FIG. 4 is a flowchart of a method for assigning a risk rating.

Referring to FIG. 4, the step 280 of assigning a risk rating in FIG. 3 can include the steps of determining a first risk rating for a computing resource based on a risk score in step 400, determining if the first risk rating is greater than a zone risk rating in step 410, leaving the first risk rating unchanged in step 420 if the first risk rating is not greater than the zone risk rating, and replacing the first risk rating with the zone risk rating in step 430 if the first risk rating is greater than the zone risk rating.

Figure 5:
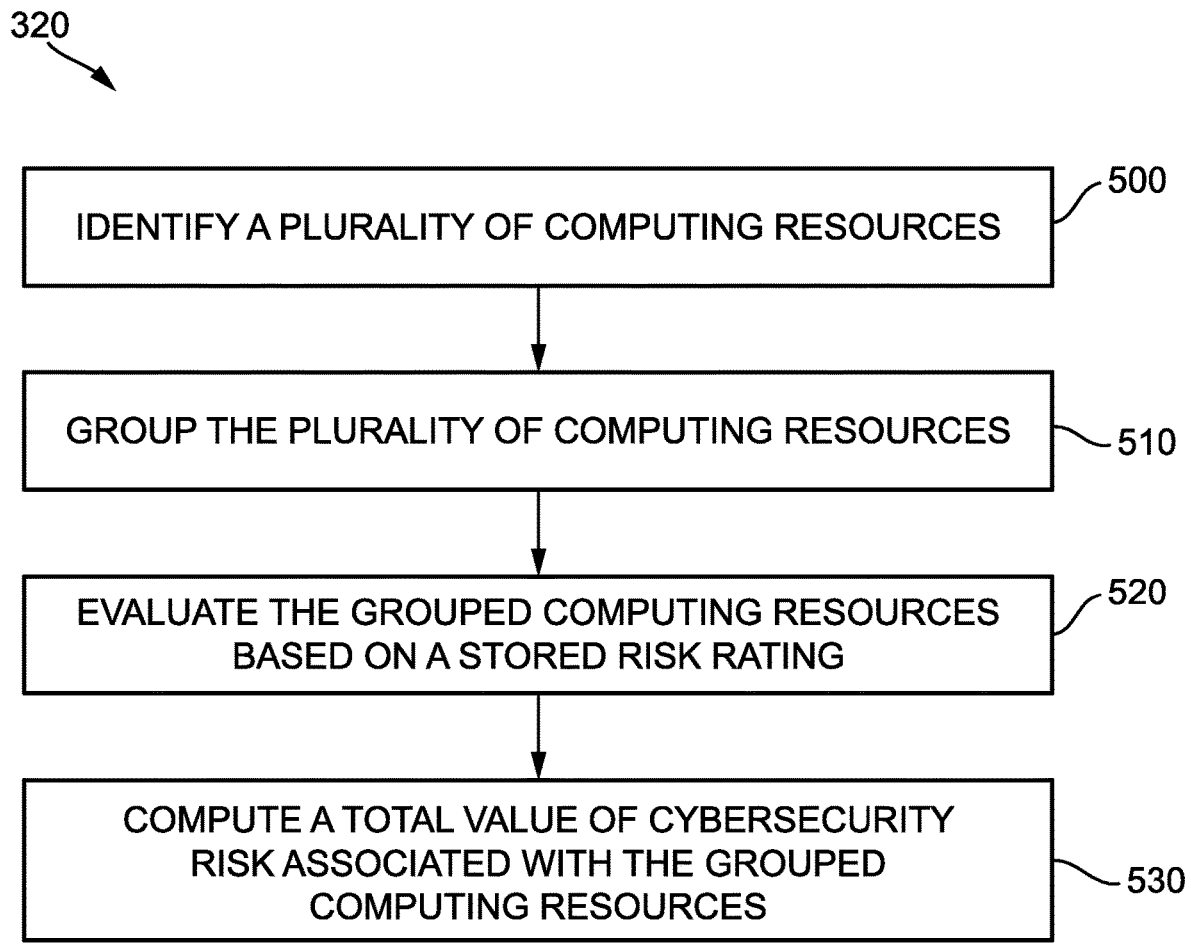
FIG. 5 is a flowchart of a method for adding additional application information.

Referring to FIG. 5, the step 320 of adding additional application information in FIG. 3 can include the steps of identifying a plurality of computing resources in step 500, grouping the plurality of computing resources in step 510, evaluating the grouped computing resources based on a stored risk rating in step 520, and computing a total value of cybersecurity risk associated with the grouped computing resources in step 530. The total value of cybersecurity risk can then be divided by the number of the grouped computing resources to obtain the average or mean of all of the risk scores in step 330 of FIG. 3.

In operation, the disclosed system and method 200 use the stored risk ratings to calculate an overall risk for a group of applications in a common network zone. For example, Application A can have a risk rating of Medium in an extranet in the network 10. Application B can be in the same zone as Application A, that is, in the same extranet, but Application B can have a risk rating of Low. Accordingly, the overall risk for applications in that extranet zone is Medium.

The disclosed system and method 200 assign a risk score based on the selected predetermined framework. The assigned risk score is stored in memory for future reference and further calculation. The assigning of the risk score based on the selected predetermined framework depends on the types of applications being evaluated, since some frameworks are specific to the application type. For example, OWASP is applicable for an application having source code which is developed in-house. On the other hand, CVSS is applicable for an application with a vulnerability. The disclosed system and method 200 add a parameter to the application information in step 220 to check that the selected framework is appropriate to the application being evaluated for a risk score.

Using the disclosed system and method 200, calculation of the overall risk rating for a group of applications in the same network zone allows decision makers to understand the risk of certain computer resources, such as applications, and then to assign the proper computer resources to secure such applications and, thus, to secure the overall network 10. The disclosed system and method 200 divide applications into zones in which the applications are hosted and so the risk scores for each application add to the measure of the risk of a specific network zone. Enterprises have a need for such zone-based risk scores since enterprises undergo compliance regulation to check cybersecurity measurements of each respective enterprise. Compliance regulation can utilize zone-based risk scores to distribute a budget based on the risk.

For implementing the present disclosure, the security appliance 30 can include a sound generation device (not shown), such as, for example, a speaker, a sound pickup device (not shown), such as, for example, a microphone, or a display device (not shown), such as, for example, a light emitting diode (LED) display or a liquid crystal display (LCD). The security appliance 30 can include a voice command device (not shown), a smart voice recognition (not shown) or a voice activated device (not shown).

The processor 44 can include any of various commercially available computing devices, including for example, a central processing unit (CPU), a graphic processing unit (GPU), a general-purpose GPU (GPGPU), a field programmable gate array (FGPA), an application-specific integrated circuit (ASIC), a manycore processor, multiple microprocessors, or any other computing device architecture can be included in the processor 44.

The security appliance 30 can include a non-transitory computer-readable storage medium that can hold executable or interpretable computer program code or instructions that, when executed by the processor 44 or one or more of the other components (e.g., computing devices or modules) in the security appliance 30, causes the steps, processes or methods in this disclosure to be carried out. The computer-readable storage medium can be included in the memory 46. The computer readable storage medium can include sections or segments of computer program code or instructions that, when executed by one or more components in the security appliance 30, can cause the security appliance 30 to carry out the processes set forth in or contemplated by this disclosure, including the process steps described herein, with reference to FIG. 3.

The memory 46 can include a read only memory (ROM) and a random-access memory (RAM). A basic input/output system (BIOS) can be stored in the non-volatile memory, which can include, for example, a ROM, an EPROM, or an EEPROM. The BIOS can contain the basic routines that help to transfer information between components in the security appliance 30, such as during start-up. The RAM can include a high-speed RAM such as static RAM for caching data.

The memory 46 can include a hard disk drive (HDD) and an optical disk drive (ODD). The HDD can include an enhanced integrated drive electronics (EIDE) drive or a serial advanced technology attachments (SATA) drive. The ODD can include a read/write from/to a CD-ROM disk (not shown) or read from or write to other high capacity optical media such as a digital versatile disc (DVD). The HDD or ODD can be arranged for external use in a suitable chassis (not shown). The memory 46 can be connected to the bus B1 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The memory 46, including computer-readable media, can provide nonvolatile storage of data, data structures, and computer-executable instructions. The memory 46 can accommodate the storage of any data in a suitable digital format. The memory 46 can include one or more computing resources such as, for example, program modules or software applications that can be used to execute aspects of the architecture included in this disclosure.

One or more computing resources can be stored in the memory 46, including, for example, an operating system, an application program, an application program interface (API), a program module, or program data. The computing resource can include an API such as, for example, a web API, a simple object access protocol (SOAP) API, a remote procedure call (RPC) API, a representation state transfer (REST) API, or any other utility or service API. One or more of the computing resources can be cached in the RAM as executable sections of computer program code or retrievable data.

The network security system 40 can be connected to a network such as the computer network 10 (shown in FIG. 1) or the Internet (not shown). The network security system 40 can be connected to the computer resources in the computer network 10 (shown in FIG. 1). The network security system 40 can include a wired or a wireless communication network interface (not shown) or a modem (not shown). When used in a LAN, the security appliance 30 can be connected to the LAN through the wired or wireless communication network interface; and, when used in a wide area network (WAN), the security appliance 30 can be connected to the WAN network through the modem. The modem (not shown) can be internal or external and wired or wireless. The modem can be connected to the bus B1 via, for example, a serial port interface (not shown).

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communicating device," as used in this disclosure, means any computing device, hardware, firmware, or software that can transmit or receive data packets, instruction signals or data signals over a communication link. The communication device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer" or "computing device," as used in this disclosure, means any machine, device, circuit, component, or module, or any system of machines, devices, circuits, components, or modules that are capable of manipulating data according to one or more instructions. The terms "computer" or "computing device" include, for example, without limitation, a processor, a microprocessor (µC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The term "computer resource asset," as used in this disclosure, means a computing resource, a computing device or a communication device.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "computing resource," as used in this disclosure, means software, a software application, a web application, a web page, a computer application, a computer program, computer code, machine executable instructions, or firmware.

The term "connectivity link," as used in this disclosure, means a communication link or any combination of communication links that connects two or more nodes, carrying data packets between the nodes. A data packet can include an Internet Protocol (IP) data packet. A data packet can include an instruction signal that, when received by a communicating device can cause the device to carry out a predetermined function or task. The data packet can include a data packet signal that, when received by a communicating device can be implemented in carrying out a predetermined function or task or processed to render information.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "node," as used in this disclosure, means a physical or virtual location in a computer network that comprises or can comprise a computer resource asset.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method is configured to remediate a cybersecurity risk of a computing resource located in a computer network that has a plurality of other computing resources, each having an associated risk, comprising:
   receiving data associated with a first computing resource in a network zone of the computer network;
   selecting a first risk framework from among a plurality of risk frameworks;
   calculating a risk score of the first computing resource based on the received data and the selected first risk framework;
   determining a first risk rating for the first computing resource based on the calculated risk score;
   comparing the first risk rating for the first computing resource against a zone risk rating to determine whether the first risk rating is greater than the zone risk rating;
   replacing the first risk rating by the zone risk rating for the first computing resource when the zone risk rating is greater than the first risk rating; and
   remediating the cybersecurity risk of the first computing resource according to the first risk rating.

2. The method of claim 1, wherein the remediating of the cybersecurity risk includes assigning another computing resource to the first computing resource according to the calculated risk score.

3. The method of claim 1, wherein the plurality of risk frameworks are international risk frameworks.

4. The method of claim 1, wherein the first risk framework is selected from the group consisting of: the Open Web Application Security Project (OWASP) framework, the Common Vulnerability Scoring System (CVSS) framework, the TRIKE framework, and the OCTAVE framework.

5. The method of claim 1, wherein the selecting of the first risk framework is based on the received data.

6. The method of claim 1, wherein a memory is configured to store the calculated risk score so as to define a score board of the calculated risk score.

7. The method of claim 1, further comprising:
   identifying a plurality of computing resources;
   grouping the plurality of computing resources;
   evaluating the grouped computing resources based on a stored risk rating; and
   computing a total value of a cybersecurity risk associated with the grouped computing resources.

8. The method of claim 1, further comprising:
   calculating an average risk score from a plurality of risk scores, each corresponding to the associated risks of the plurality of other computing resources; and
   remediating the cybersecurity risk of the first computing resource according to the calculated average risk score.

9. The method of claim 8, wherein the remediating of the cybersecurity risk includes assigning another computing resource to the first computing resource according to the calculated average risk score.

10. The method of claim 8, wherein a memory is configured to store the calculated average risk score so as to define a score board of the calculated average risk score.

11. A non-transitory computer readable storage medium storing computer program instructions that, when executed by a security appliance, remediate a cybersecurity risk of a computing resource located in a computer network that has a plurality of other computing resources, each having an associated risk, the computer program instructions comprising:
   receiving data associated with a first computing resource in a network zone of the computer network;
   selecting a first risk framework from among a plurality of risk frameworks;
   calculating a risk score of the first computing resource based on the received data and the selected first risk framework;
   determining a first risk rating for the first computing resource based on the calculated risk score;
   comparing the first risk rating for the first computing resource against a zone risk rating to determine whether the first risk rating is greater than the zone risk rating;
   replacing the first risk rating by the zone risk rating for the first computing resource when the zone risk rating is greater than the first risk rating; and
   remediating the cybersecurity risk of the first computing resource according to the first risk rating.

12. The non-transitory computer readable storage medium of claim 11, wherein the remediating of the cybersecurity risk includes assigning another computing resource to the first computing resource according to the calculated risk score.

13. The non-transitory computer readable storage medium of claim 11, wherein the first risk framework is selected from the group consisting of: the Open Web Application Security Project (OWASP) framework, the Common Vulnerability Scoring System (CVSS) framework, the TRIKE framework, and the OCTAVE framework.

14. The non-transitory computer readable storage medium of claim 11, wherein the computer program instructions further comprise:
calculating an average risk score from a plurality of risk scores, each corresponding to the associated risks of the plurality of other computing resources; and
remediating the cybersecurity risk of the first computing resource according to the calculated average risk score.

15. The non-transitory computer readable storage medium of claim 14, wherein the remediating of the cybersecurity risk includes assigning another computing resource to the first computing resource according to the calculated average risk score.

16. A system is configured to remediate a cybersecurity risk of a computing resource located in a computer network that has a plurality of other computing resources, each having an associated risk, the system comprising:
a security analyst communicating device configured to receive data associated with a first computing resource in a network zone of the computer network, and to select a first risk framework from among a plurality of risk frameworks; and
a security appliance configured to calculate a risk score of the first computing resource based on the received data and the selected first risk framework, to determine a first risk rating for the first computing resource based on the calculated risk score, to compare the first risk rating for the first computing resource against a zone risk rating to determine whether the first risk rating is greater than the zone risk rating, to replace the first risk rating by the zone risk rating for the first computing resource when the zone risk rating is greater than the first risk rating, and to remediate the cybersecurity risk of the first computing resource according to the calculated risk score.

17. The system of claim 16, wherein the security appliance remediates the cybersecurity risk by assigning another computing resource to the first computing resource according to the calculated risk score.

18. The system of claim 16, further comprising:
a memory configured to store the calculated risk score.

19. The system of claim 16, wherein the security appliance calculates an average risk score from a plurality of risk scores, each corresponding to the associated risks of the plurality of other computing resources and remediates the cybersecurity risk of the first computing resource according to the calculated average risk score.

20. The system of claim 19, wherein the security appliance remediates the cybersecurity risk by assigning another computing resource to the first computing resource according to the calculated average risk score.

* * * * *